(12) United States Patent
Lee

(10) Patent No.: US 6,431,336 B1
(45) Date of Patent: Aug. 13, 2002

(54) VIBRATION ATTENUATING APPARATUS AND METHOD FOR USE ON THE DAMPER SPRING OF CLUTCH DISC

(75) Inventor: Hong-Woo Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/650,008

(22) Filed: Aug. 28, 2000

(30) Foreign Application Priority Data

Oct. 29, 1999 (KR) .............................................. 99-47436

(51) Int. Cl.⁷ ................................................ F16F 15/16
(52) U.S. Cl. .................................. 192/30 V; 192/70.17; 192/212
(58) Field of Search ............................ 192/30 V, 70.17, 192/212, 57; 188/267.1, 269; 74/55.4, 574; 464/24

(56) References Cited

U.S. PATENT DOCUMENTS 5,878,851 A * 3/1999 Carlson et al. ............. 188/269
5,947,238 A * 9/1999 Jolly et al. ................ 188/267.1
6,050,380 A * 4/2000 Peinemann et al. ........ 192/55.4
6,151,930 A * 11/2000 Carlson ..................... 68/12.06

* cited by examiner

Primary Examiner—Saul Rodriguez
(74) Attorney, Agent, or Firm—Christie, Parker & Hale, LLP

(57) ABSTRACT

In vibration attenuating apparatus and method for use on damper springs of a clutch disc, the clutch disc includes clutch plates, a clutch hub splinedly connected to a clutch shaft, frictional facings mounted on front and rear surfaces of the clutch plates, and damper springs mounted on the clutch plates. The apparatus further includes variable damping means inserted into each damper spring. The variable damping means controls a damping coefficient of the damper springs in accordance with an intensity of an electric current provided by an electronic control unit in order to prevent the transmission of abnormal vibration of an engine to a transmission unit.

4 Claims, 5 Drawing Sheets

VIBRATION ATTENUATING APPARATUS
AND METHOD FOR USE ON THE DAMPER
SPRING OF CLUTCH DISC

CROSS-REFERENCES TO RELATED
APPLICATIONS

This application is based on Korean patent application No. 99-47436 filed on Oct. 29, 1999, the disclosure of which is incorporated herein by reference.

BACKGROUND OF THE INVENTION (a) Field of the Invention

The present invention relates to a vibration attenuating apparatus and method, more particularly, to a vibration attenuating apparatus and method which includes an electrically controlled damping means changing the damping coefficient of a damper spring for preventing vibration transmitting from an engine to a transmission unit.

(b) Description of the Related Art

Generally, as shown in FIG. 6, vehicles have an engine 112 for generating driving power, and a transmission unit 114 for changing the torque and speed of the engine. The transmission unit is classified as an automatic transmission unit or a manual transmission unit. The manual transmission unit has a clutch for controlling the connection of the engine power to the transmission unit.

The clutch includes a clutch cover 118 connecting to the flywheel 116, clutch disc 120 mounted between the clutch cover 118 and flywheel 116 for transmitting the engine output to the transmission unit by way of a clutch shaft, and a release bearing 122 for transmitting the pedal depressing force by way of a release fork.

FIG. 7 shows the detailed structure of the clutch disc 120 according to the prior art. The clutch disc 120 include clutch plates 124, a clutch hub 126 splinedly connected to the clutch shaft, frictional facings 128 mounted on front and rear surface of the clutch plates 124, and damper springs 130 mounted on the clutch plates 124 for attenuating the rotating vibration of an engine.

When the torque variation of an engine increases above the normal torque range, the abnormal torque variation generates torsional vibration in the driving system, including the transmission unit, and makes the whole car body vibrate severely.

To prevent transmitting the abnormal vibration to the driving system, damper springs are mounted in the clutch disc. However, since damper springs have fixed damping coefficients, they can not flexibly respond to the variation of engine torque, and thus they cannot attenuate the abnormal vibration effectively. On the other hand, damper springs with a high damping coefficient can be used, but a high damping coefficent of the damper spring negatively affects the driveability of vehicles.

SUMMARY OF THE INVENTION

Accordingly, it is an object of the present invention to provide a vibration attenuating apparatus and method which can prevent transmission of abnormal vibration to a transmission unit without negatively affecting driveability.

This and other objects may be achieved by a vibration attenuating apparatus for use on damper springs of a clutch disc including clutch plates, a clutch hub splinedly connected to a clutch shaft, frictional facings mounted on front and rear surfaces of the clutch plates, and damper springs mounted on the clutch plates.

The vibration attenuating apparatus includes variable damping means inserted into each damper spring, controlling a damping coefficient of the damper springs in accordance with an intensity of an electric current provided by an electronic control unit. The variable damping means may include a chamber inserted into the damper spring, and electro-rheological fluid filling up said chamber and controlling the damping force of said damper springs by way of shear resistance due to an anisotropic characteristic thereof.

According to the invention, there is also provided a method for the electronic control unit to control the vibration attenuating apparatus for use on the damper springs of a clutch disc including the first step of detecting a speed of a vehicle and a torque variation of the engine. When the detected speed of the vehicle is within a predetermined speed range and the detected torque of the engine is above a standard torque range in relation to the speed of vehicle, the electronic control unit provides an electric current to the electro-rheological fluid which is inserted into the damper spring of the clutch disc. Then, the electronic control unit detects the torque variation of the transmission. Finally, when the detected torque of the transmission is within a standard transmission torque range in relation to the speed of the vehicle, the electronic control unit stops the electric current from flowing to the electro-rheological fluid. However, when the detected torque of the transmission deviates from the standard transmission torque range in relation to the speed of the vehicle, the electronic control unit increases the intensity of the electric current by a predetermined amount, then detects the torque variation of the transmission again.

The predetermined speed range of vehicles in the step of providing electric current may be from 20 km/h to 60 km/h.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE
PREFERRED EMBODIMENTS

A preferred embodiment of this invention will be explained with reference to the accompanying drawings.

Figure 1:
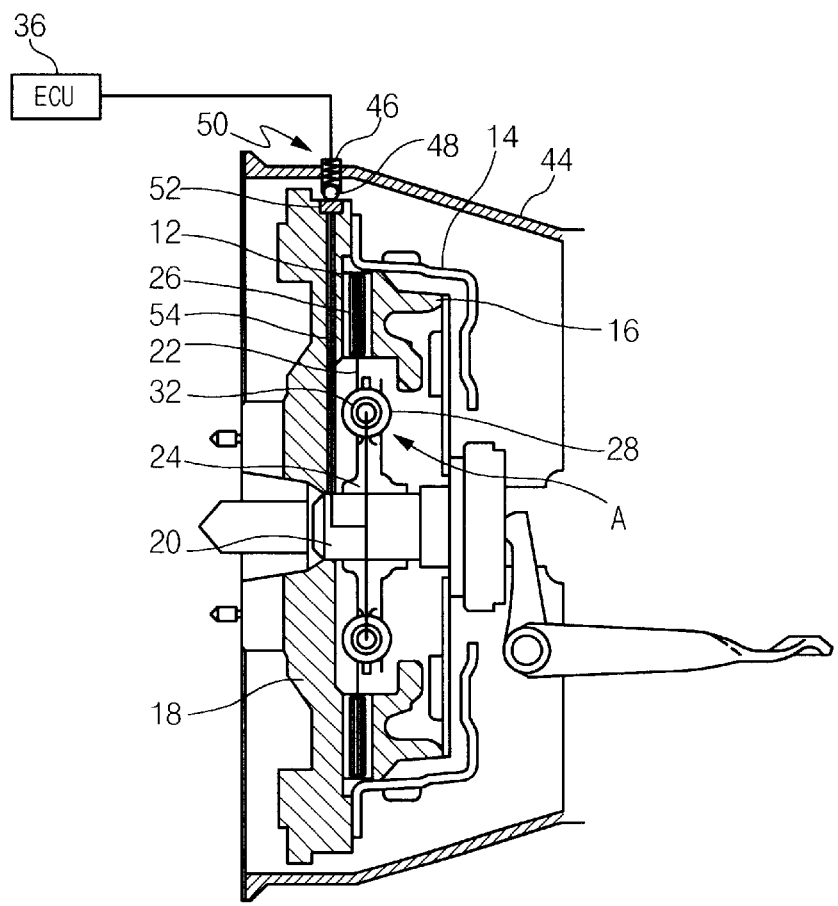
FIG. 1 is a cross-sectional view illustrating a clutch device according to a preferred embodiment of the present invention.

FIG. 1 illustrates a clutch device according to a preferred embodiment of the present invention.

As shown in FIG. 1, a clutch disc is frictionally contacted to a flywheel 18 by means of a pressure disc 16 within a clutch cover 14 and they transmit power of an engine to a transmission unit by way of a clutch shaft 20.

As described above in a prior art, the clutch disc has clutch plates 22, a clutch hub 24, facings 26, and damper springs 28 which are mounted on the clutch plates 22.

Figure 2:
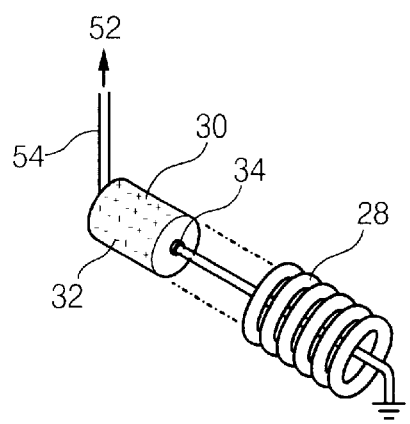
FIG. 2 is an enlarged view of portion A in FIG. 1.

The clutch disc includes a variable damping means for preventing the transmission of abnormal torque variation of the engine to the transmission unit. This variable damping means, as shown in FIG. 2, has a tube chamber 30 inserted in each of the damper springs 28, and electro-rheological fluid 32 filling up the chamber 30. The chamber 30 is connected with an electronic control unit by way of a terminal 34 formed in each side thereof. For the purpose of providing the chamber 30 with electric current from the electronic control unit which is installed outside the transmission, a terminal case 50 is mounted on the transmission cover 44. The terminal case 50 is connected with the electronic control unit and has a spring 46 therein which supports a ball 48 with constant elastic force. The ball 48 contacts a conductor 52 which is formed along the outer circumference of the flywheel 18. By way of a connector cable 54 through the flywheel 18 and clutch shaft 20, conductor 52 is electronically connected to the terminal 34 of chamber 30.

When electric current from the electronic control unit turns OFF, the electro-rheological fluid 32 in the chamber 30 has an isotropic characteristic in which fluid particles move in an arbitrary direction. However, when the current turns ON, the electro-rheological fluid 32 has an anisotropic characteristic in which fluid particles arrange along a current path by a polarization effect and the arranged particles can form a fiberized structure which increases shear resistance against the elastic movement of the damper spring 28.

Figure 5:
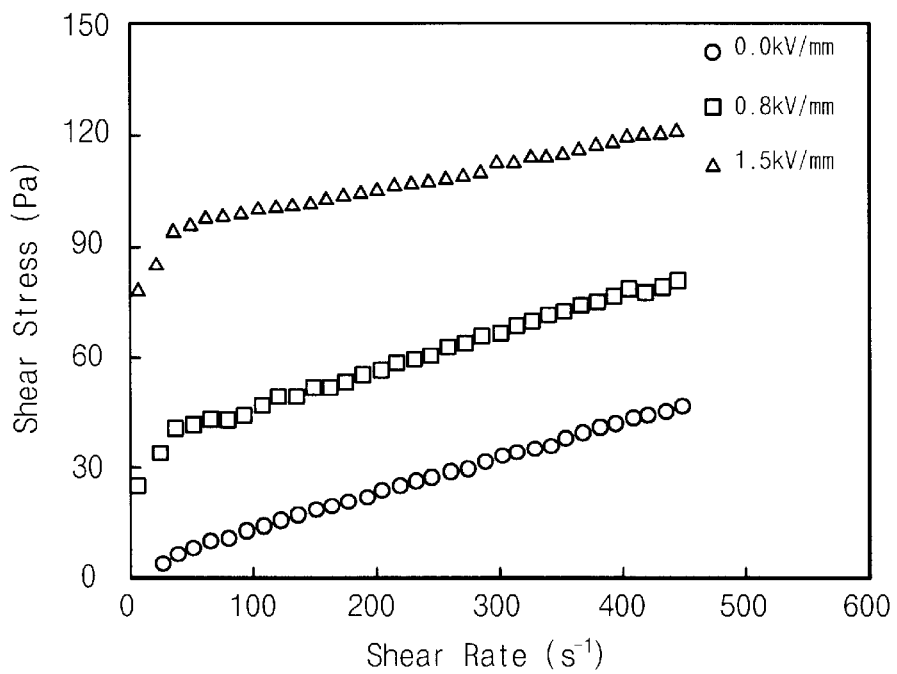
FIG. 5 is a graph showing a variation of shear force of electro-rheological fluid according to a preferred embodiment of the present invention.
Figure 6:
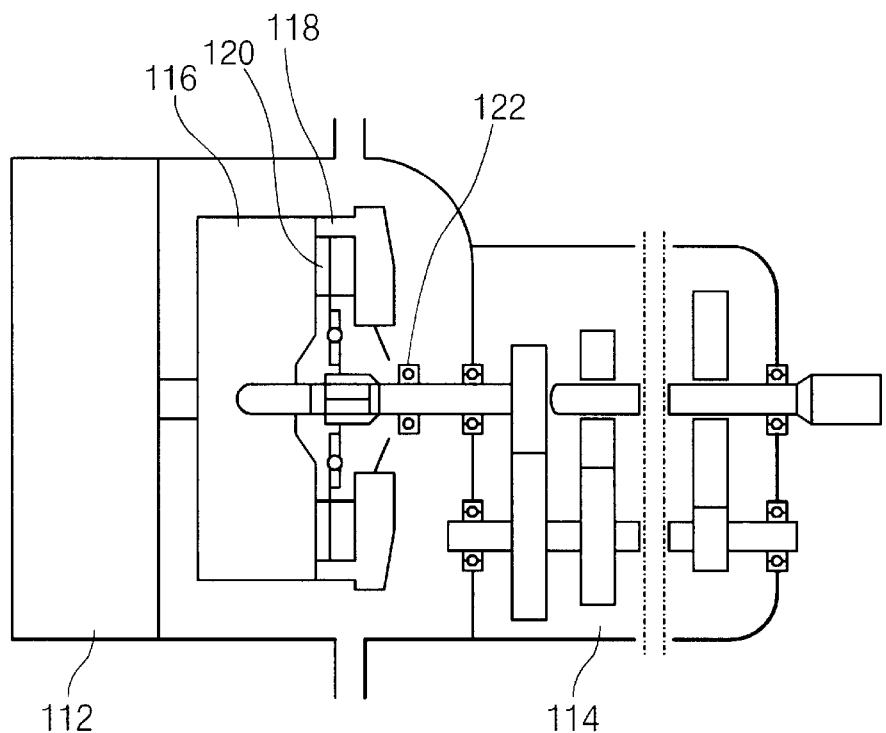
FIG. 6 is a schematic illustration of the power train system of vehicles according to a prior art.
Figure 7:
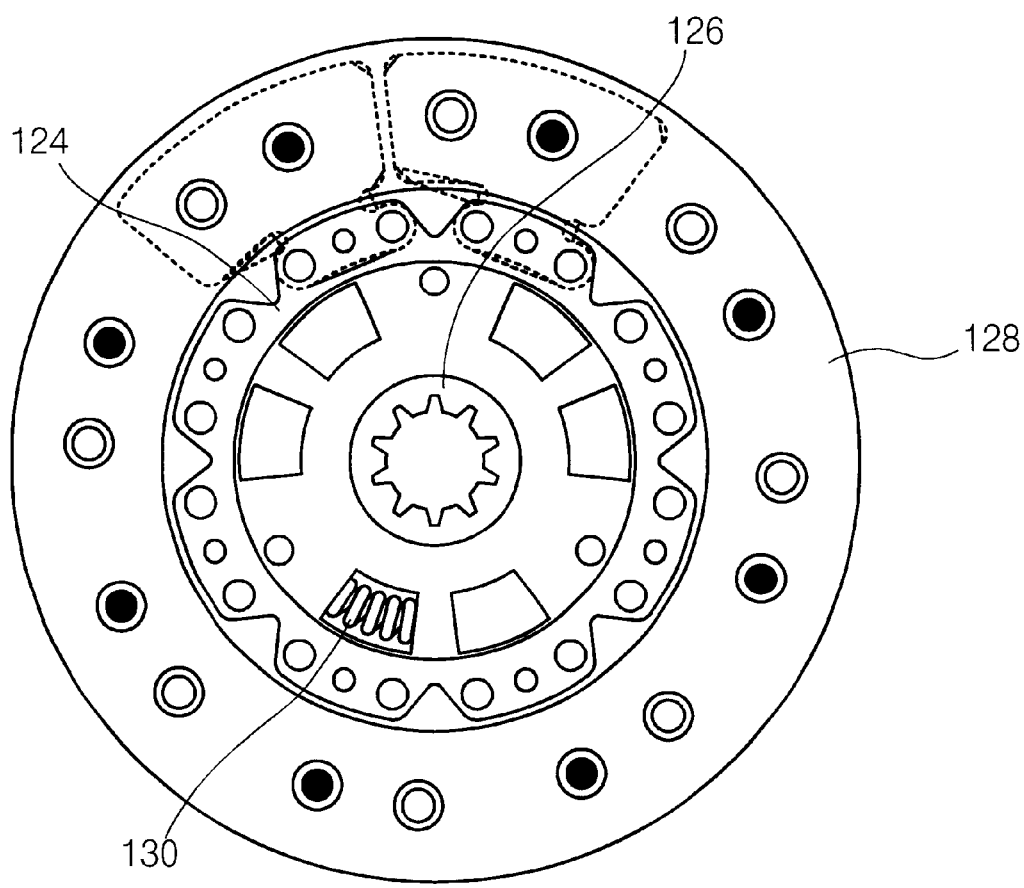
FIG. 7 is a sectional view illustrating a clutch disc according to a prior art.

Since the shear resistance, as shown in FIG. 5, varies according to an electric field intensity on the electro-rheological fluid 32, the electronic control unit can restrict the resilience of the damper spring 28 by adjusting the intensity of the electric current. Therefore, the damping coefficient of the damper spring 28 can be changed by the electronic control unit.

Figure 3:
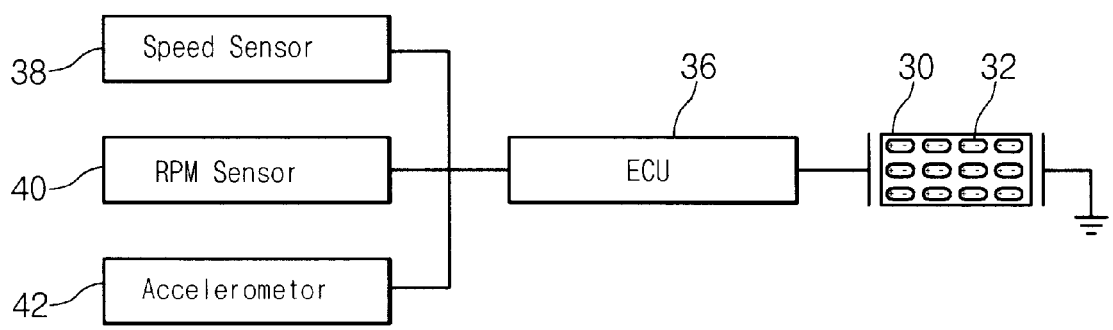
FIG. 3 is a block diagram showing detecting means for a power supply according to a preferred embodiment of the present invention.

FIG. 3 shows detecting means for the condition of providing electric current to the electro-rheological fluid 32.

The detecting means are connected to the electronic control unit 36 and include a speed sensor 38 for detecting speed of a vehicle, an rpm sensor 40 for detecting engine torque variation, and an accelerometer 42 for detecting the transmission torque variation. The electronic control unit 36 supplies or changes the electric current to the electro-rheological fluid in the condition of the speed being in a range of 20 km/h to 60 km/h which is detected by the speed sensor 38, and of engine torque being above a standard torque limit which is detected by the rpm sensor 40. The above condition indicates that there is an abnormal torque variation in the engine. Therefore, the electronic control unit 36 adjusts a damper coefficient of the damper springs 28 in the above condition in order to prevent transmitting engine vibration to the transmission unit.

Figure 4:
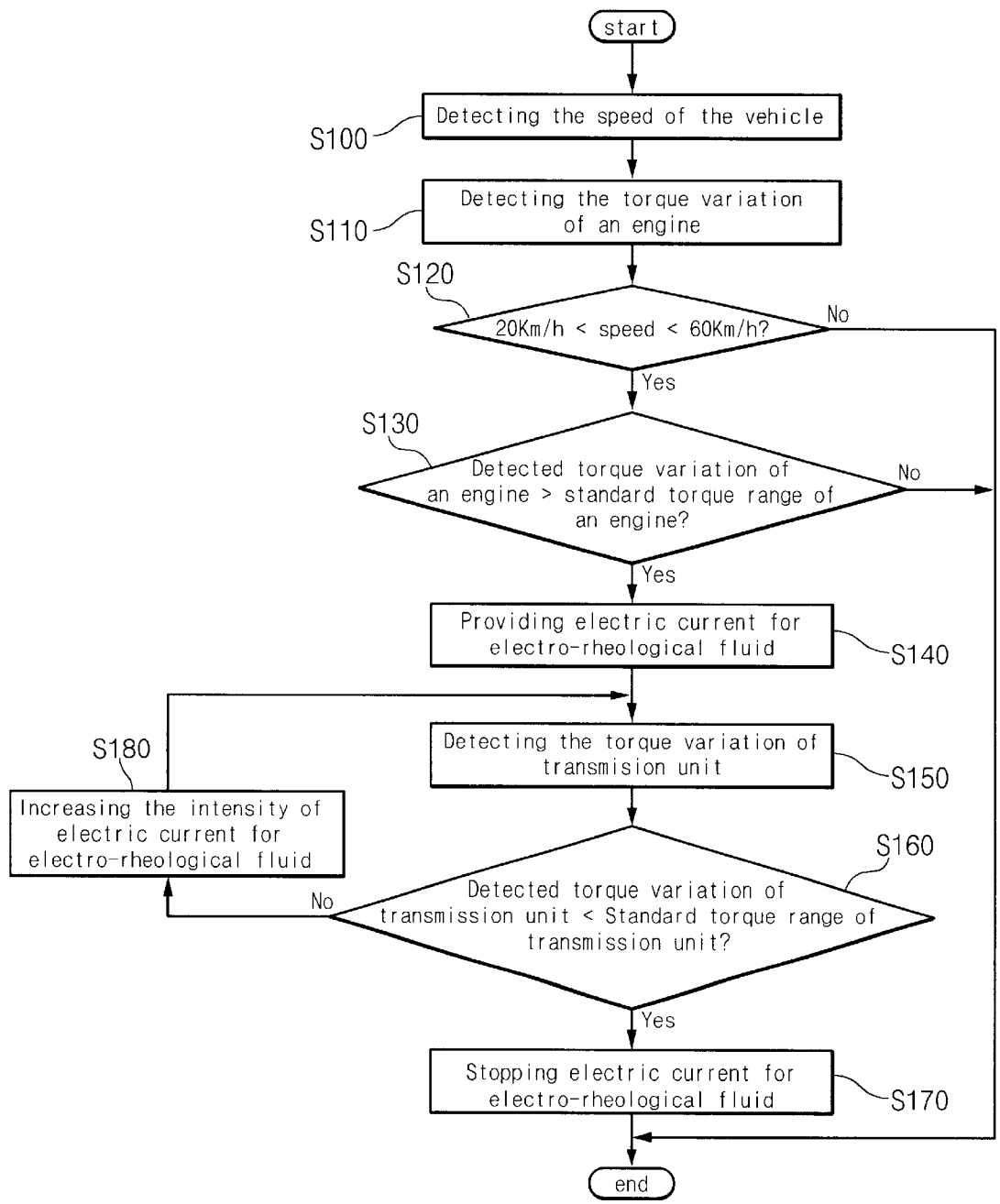
FIG. 4 is a flowchart showing a vibration attenuating method according to a preferred embodiment of the present invention.

FIG. 4 shows the method for attenuating vibration of the transmission unit using the inventive variable damping means.

First, the speed sensor 38 detects the speed of the vehicle and the rpm sensor 40 detects the variation of the engine torque (S100, S110). Then, the electronic control unit 36 determines whether the speed of the vehicle is in the range of 20 km/h to 60 km/h and if the variation value of the engine torque is above the standard engine torque range in relation to the speed of the vehicle (S120, S130). This standard engine torque range is predetermined by specifying a normal variation range of the RPM of the engine in accordance with the speed of the vehicle.

When the rpm sensor 40 detects a deviated engine torque, the electronic control unit determines that there is an abnormal vibration of the engine and thus provides electric current to the electro-rheological fluid 32 of the damper spring 28 (S140). The electric current from the electronic control unit is provided into the transmission cover by way of the variable terminal 50 and then arrives at the electro-rheological fluid 32 by way of the conductor 52 which is contacting the variable terminal 50 and connecting cable 54.

When the electric current is provided to the electro-rheological fluid 32, the electro-rheological fluid 32 generates shear resistance against the resilience of the damper spring 28, which increases the damping coefficient of the damper spring 28 and consequently attenuates the vibration which is transmitted to the transmission unit from the engine.

While the electronic control unit provides the electric current to the electro-rheological fluid 32, it detects the torque variation of the transmission by way of the accelerometer 42 (S150). Then, the electronic control unit determines whether the detected torque variation is within the standard transmission torque range (S160). This standard transmission torque range is predetermined by specifying the normal variation range of the output torque of the transmission in accordance with the speed of the vehicle.

Finally, when the accelerometer 42 detects a normal transmission torque, the electronic control unit 36 stops providing electric current to the electro-rheological fluid 32 of the damper spring 28 (S170). On the other hand, when the accelerometer 42 detects a deviated transmission torque, the electronic control unit 36 increases the intensity of the electric current by some amount, then returns to the step of detecting the torque variation of the transmission by way of the accelerometer 42 (S180).

As described above, in the inventive apparatus and method for attenuation of vibration transmitted from the engine to the transmission unit, abnormal vibration can be effectively prevented, since the shear resistance of the electro-rheological fluid can be changed in accordance with the output torque of the transmission unit. Moreover, the inventive vibration apparatus does not negatively affect the driveability of the vehicle, since the electro-rheological fluid can generate the shear resistance in only a specified speed range. Naturally, the silence of the vehicle can be increased by the vibration attenuation.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for controlling a vibration attenuation of damper springs of a clutch disc of a vehicle, the method comprising the steps of:
    (a) detecting a speed of the vehicle and a torque variation of an engine;
    (b) providing an electric current to an electro-rheological fluid located within the damper springs of the clutch disc when a detected speed of the vehicle is within a predetermined speed range and a detected torque of the engine is above a predetermined torque range in relation to the speed of the vehicle;

(c) detecting a torque variation of a transmission; and (d) stopping the electric current flowing to the electro-rheological fluid when the detected torque of the transmission is within a predetermined-transmission torque range in relation to the speed of the vehicle.

2. The method for controlling the vibration attenuation of the damper springs of the clutch disc according to claim 1, further comprising the step of increasing the intensity of the electric current by a predetermined amount, then returning to detecting a torque variation step when the detected torque of the transmission deviates from the predetermined transmission torque range in relation to the speed of the vehicle.

3. The method for controlling the vibration attenuation of the damper springs of the clutch disc according to claim 1, where the predetermined speed range of the vehicle is from 20 km/h to 60 km/h.

4. A vibration attenuating apparatus for use on a damper spring of a clutch disc including a clutch plate, a clutch hub coupled to a clutch shaft, frictional facings mounted on front and rear surfaces of the clutch plate, and a damper spring mounted on the clutch plate, the vibration attenuating apparatus comprising:

a tubular chamber inserted into the damper spring;

an electro-rheological fluid in the chamber for causing a shear resistance against the movements of the damper spring; and an electronic control unit controlling the intensity of an electric current provided to the chamber, wherein the electronic control unit, detects a speed of a vehicle and a torque variation of an engine, provides an electric current to the electro-rheological fluid when the detected speed of the vehicle is within a predetermined speed range and the detected torque of the engine is above a predetermined torque range in relation to the speed of the vehicle, and detects a torque variation of a transmission, and stops the electric current flow to the electro-rheological fluid when the detected torque of the transmission is within a predetermined transmission torque range in relation to the speed of the vehicle.

* * * * *